United States Patent
Munagala et al.

(10) Patent No.: US 9,800,638 B2
(45) Date of Patent: Oct. 24, 2017

(54) DOWNSTREAM BANDWIDTH AWARE ADAPTIVE BIT RATE SELECTION

(71) Applicant: AT&T INTELLECTUAL PROPERTY I, L.P., Atlanta, GA (US)

(72) Inventors: Ramana V. Munagala, Holmdel, NJ (US); Vishwa M. Prasad, Matawan, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 739 days.

(21) Appl. No.: 14/071,450

(22) Filed: Nov. 4, 2013

(65) Prior Publication Data

US 2015/0127775 A1    May 7, 2015

(51) Int. Cl.
*G06F 15/16* (2006.01)
*H04L 29/06* (2006.01)
*H04N 21/222* (2011.01)
*H04N 21/2343* (2011.01)
*H04N 21/24* (2011.01)
*H04N 21/2662* (2011.01)

(52) U.S. Cl.
CPC ............ *H04L 65/601* (2013.01); *H04L 65/80* (2013.01); *H04N 21/222* (2013.01); *H04N 21/23439* (2013.01); *H04N 21/2402* (2013.01); *H04N 21/2662* (2013.01)

(58) Field of Classification Search
CPC ... H04L 65/601; H04L 65/80; H04N 21/2402; H04N 21/2662
USPC .................................................. 709/217, 219
See application file for complete search history.

(56) References Cited

U.S. PATENT DOCUMENTS

| | | |
|---|---|---|
| 5,677,906 A | 10/1997 | Hayter et al. |
| 6,115,359 A | 9/2000 | Depelteau et al. |
| 6,266,345 B1 | 7/2001 | Huang |
| 6,512,743 B1 | 1/2003 | Fang |
| 6,909,745 B1* | 6/2005 | Puri .............. H04N 19/70 348/384.1 |
| 7,130,267 B1 | 10/2006 | Wendorf et al. |
| 7,457,312 B2 | 11/2008 | Weiss et al. |
| 7,606,154 B1 | 10/2009 | Lee |
| 7,697,436 B2 | 4/2010 | Wu et al. |

(Continued)

FOREIGN PATENT DOCUMENTS

WO    2010038226 A1    4/2010

*Primary Examiner* — June Sison
*Assistant Examiner* — Adam Cooney
(74) *Attorney, Agent, or Firm* — Akerman LLP; Michael K. Dixon; Mammen (Roy) P. Zachariah, Jr.

(57) ABSTRACT

A system for providing downstream bandwidth aware adaptive bit rate selection is disclosed. The system may determine a fixed bandwidth available to transmit content to a client on a second network. The system may connect to a first network, which may be configured to have no specific bandwidth constraints, to obtain the content. Once the system is connected to the first network, the system may receive, from the first network, a content segment of the content that is encoded at a first bandwidth. The first bandwidth may be less than or equal to the lesser of the fixed bandwidth available to transmit the content to the client on the second network and a first adaptive bit rate that is selected based on a congestion condition experienced on the first network. The system may then transmit the content segment at the first bandwidth to the client on the second network.

20 Claims, 4 Drawing Sheets

(56) References Cited

U.S. PATENT DOCUMENTS

| | | | | |
|---|---|---|---|---|
| 8,396,983 | B1* | 3/2013 | Inskip | H04L 29/06517 709/203 |
| 2010/0299552 | A1* | 11/2010 | Schlack | H04L 47/10 714/4.1 |
| 2011/0093605 | A1* | 4/2011 | Choudhury | H04L 65/4084 709/231 |
| 2012/0314761 | A1* | 12/2012 | Melnyk | H04L 65/605 375/240.02 |
| 2013/0138829 | A1* | 5/2013 | Bulava | H04L 65/608 709/231 |
| 2013/0195204 | A1* | 8/2013 | Reznik | H04N 19/85 375/240.26 |
| 2013/0262622 | A1* | 10/2013 | Li | H04L 65/605 709/217 |
| 2014/0082681 | A1* | 3/2014 | Brown | H04N 21/64723 725/98 |
| 2014/0344414 | A1* | 11/2014 | Ozawa | H04L 65/4076 709/219 |

* cited by examiner

DOWNSTREAM BANDWIDTH AWARE ADAPTIVE BIT RATE SELECTION

FIELD OF THE INVENTION

The present application relates to adaptive bit rate technologies and techniques for providing bandwidth selection, and more particularly, to a system for providing downstream bandwidth aware adaptive bit rate selection.

BACKGROUND

In today's society, users are increasingly utilizing network and other service providers to gain access to the Internet, access software services, request and receive various types of content, access software applications, and perform a variety of other tasks and functions. However, some media content, services, and software applications are much more popular with users than other media content, services, and applications. In order to handle large volumes of requests from users requesting popular content, services, and applications, content providers often utilize content distribution networks and systems to serve the content and provide the services to the users in a more effective manner. This is particularly true when high performance, reliability, scalability, and cost savings associated with distributing the content and providing the services are important to the content providers that provide the content, services, and software applications.

Today, one of the techniques that is most frequently used to provide content is adaptive bit rate streaming. With adaptive bit rate streaming, content providers encode content at different bit rates so that different versions of the content may be made accessible to the users based on each of the user's available bandwidth resources. The content providers typically make each of the different encoded versions of the content accessible to network providers of the users so that the users may obtain the appropriate version of the content via the network providers' networks. Content providers distributing adaptive bit rate content are typically on networks with no predetermined bandwidth capacity constraints, and clients of such networks often request content at the best rate appropriate for the congestion conditions each client experiences. However, the network provider networks often do not have control over the content providers and often require fixed bandwidth constraints based on the large numbers of users that the network providers have on their networks.

When conditions on the upstream content provider networks permit, intermediary devices requesting content for the users from the content provider may select the highest rate content available from the content provider. However, the selection of the highest rate content available may exceed the allocated and fixed bandwidth constraints that have been set for the network provider networks and their users. As a result, when a device transmits the selected stream of the content at a rate exceeding the allocated and fixed bandwidth constraints associated with the network provider network, the users receiving the streams may experience quality degradation when accessing the content. A possible solution to this problem is to set a bandwidth limit on the encoder and, in addition, utilizing buffering. However, this solution is only feasible in situations where the encoder is in the control of the network provider. More often than not, however, the content provider distributes encoded content to the network provider.

SUMMARY

A system and accompanying methods for providing downstream bandwidth aware adaptive bit rate selection are disclosed. In particular, the system and methods may provide users with a more controlled and uniform experience when streams of content are streamed to the users. Notably, the systems and methods may include utilizing the functionality of a content receiver function and a content server function of a content transfer node that lies at a boundary of a network provider network. Additionally, the content transfer node may be an intermediary device that is positioned between the network provider network and a content provider network that is a source of the content that is to be distributed to the users. The content receiver function of the content transfer node may act as an adaptive bit rate client of the content provider network, and may be configured to connect to the content provider network. The content provider network may be configured to have no receiver-specific bandwidth constraints. Based on changing congestion conditions that the content receiver function experiences with respect to the content provider network, the content receiver function may adjust content segment requests so as to obtain content segments encoded at a bit rate corresponding to the congestion conditions.

Also, the content server function may be configured to connect with the network provider network, and may be aware of a fixed and guaranteed downstream bandwidth that is available for transmitting the content to a user or client of the network provider network. Notably, the content receiver function may also be made aware of the fixed and guaranteed downstream bandwidth that is available for transmitting the content to the client of the network provider network. In certain embodiments, the content server function may transmit this information to the content receiver function. Then, the content receiver function, which also functions as an adaptive bit rate client of the content provider network, may request content segments from the content provider network that are encoded at a bandwidth that is less than or equal to the lesser of the fixed and guaranteed bandwidth associated with the network provider network and the adaptive bit rate that is appropriate for the congestion conditions that the content receiver function experiences with respect to the content provider network. The content provider network may encode the content segments according to the requests from the content receiver function, and transmit the encoded content segments to the content transfer node. At this point, the content server function may transmit the encoded content segments over the allocated and fixed bandwidth to the users requesting the content. Based on the foregoing, the users may experience a more uniform experience when the users view, hear, or otherwise experience the content.

In one embodiment, a system for providing downstream bandwidth aware adaptive bit rate selection is disclosed. The system may include a memory that stores instructions and a processor that executes the instructions to perform various operations of the system. The system may determine, by utilizing a content receiver function, a fixed bandwidth available to transmit content to a client on a second network. The fixed bandwidth may be determined from a content server function of the system. The system may connect, by utilizing the content receiver function, to a first network to obtain the content. The first network may be configured to have no specific bandwidth constraints or receiver specific constraints. Once the system is connected to the first network, the system may receive, from the first network, a content segment of the content that is encoded at a first bandwidth. The first bandwidth of the content segment may be less than or equal to the lesser of the fixed bandwidth available to transmit the content to the client on the second network and a first adaptive bit rate that is selected based on a congestion condition that the content receiver function experiences on the first network. After the content segment is received, the system may transmit the content segment at the first bandwidth to the client on the second network.

In another embodiment, a method for providing downstream bandwidth aware adaptive bit rate selection is disclosed. The method may include utilizing a memory that stores instructions, and a processor that executes the instructions to perform the various functions of the method. The method may include determining, by utilizing a content receiver function, a fixed bandwidth available to transmit content to a client on a second network. The fixed bandwidth may be determined from a content server function. Additionally, the method may include connecting, by utilizing the content receiver function, to a first network to obtain the content. The first network may be configured to not have specific bandwidth constraints or receiver specific constraints. Furthermore, the method may include receiving, from the first network, a content segment of the content that is encoded at a first bandwidth. The first bandwidth may be less than or equal to the lesser of the fixed bandwidth available to transmit the content to the client on the second network and a first adaptive bit rate that is selected based on a congestion condition that the content receiver function experiences on the first network. Moreover, the method may include transmitting the content segment at the first bandwidth to the client on the second network.

According to yet another embodiment, a computer-readable device having instructions for providing downstream bandwidth aware adaptive bit rate selection is provided. The computer instructions, which when loaded and executed by a processor, may cause the processor to perform operations including: determining, by utilizing a content receiver function, a fixed bandwidth available to transmit content to a client on a second network, wherein the fixed bandwidth is determined from a content server function; connecting, by utilizing the content receiver function, to a first network to obtain the content, wherein the first network has no specific bandwidth constraints; receiving, from the first network, a content segment of the content that is encoded at a first bandwidth, wherein the first bandwidth is less than or equal to the lesser of the fixed bandwidth available to transmit the content to the client on the second network and a first adaptive bit rate that is selected based on a congestion condition that the content receiver function experiences on the first network; and transmitting the content segment at the first bandwidth to the client on the second network.

These and other features of the systems and methods for providing downstream bandwidth aware adaptive bit rate selection are described in the following detailed description, drawings, and appended claims.

DETAILED DESCRIPTION OF THE INVENTION

A system 100 and accompanying methods for providing downstream bandwidth aware adaptive bit rate selection are disclosed, as shown in FIGS. 1-5. In particular, the system 100 and methods may provide users with a more controlled and uniform experience when streams of content are streamed to the users. Notably, the system 100 and methods may include utilizing the functionality of a content receiver function and a content server function of a content transfer node 145 that lies at a boundary of a network provider network, such as second network 135. In certain embodiments, the content transfer node 145 may be an intermediary device that is positioned between the network provider network and a content provider network, such as first network 115, that is a source of the content that is to be distributed to the users. The content receiver function of the content transfer node 145 may act as an adaptive bit rate client of the content provider network, and may be configured to connect to the content provider network, which may be configured to have no receiver-specific bandwidth constraints. Based on congestion conditions that the content receiver function experiences with the content provider network, the content receiver function may adjust content segment requests so as to obtain content segments that are encoded at a bit rate that is consistent with the congestion conditions.

Also, the content server function may be configured to connect with the network provider network, and may be aware of a fixed and guaranteed downstream bandwidth that is available for transmitting the content to the client device 156 of the network provider network. Additionally, the content receiver function may also be made aware of the fixed and guaranteed downstream bandwidth that is available for transmitting the content to the client device 156 of the network provider network. At this point, the content receiver function, which functions as an adaptive bit rate client of the content provider network, may request content segments from the content provider network that are encoded at a bandwidth that is less than or equal to the lesser of the fixed and guaranteed bandwidth associated with the network provider network and the adaptive bit rate that corresponds to the congestion conditions that the content receiver function experiences with the content provider network. The content provider network may encode the content segments based on the requests from the content receiver function, and then transmit the encoded content segments to the content transfer node 145. The content server function may then transmit the encoded content segments over the allocated and fixed bandwidth to the client device 156 that is requesting the content. As a result, a user utilizing the client device 156 may experience a more uniform experience when the user experiences the content.

Figure 1:
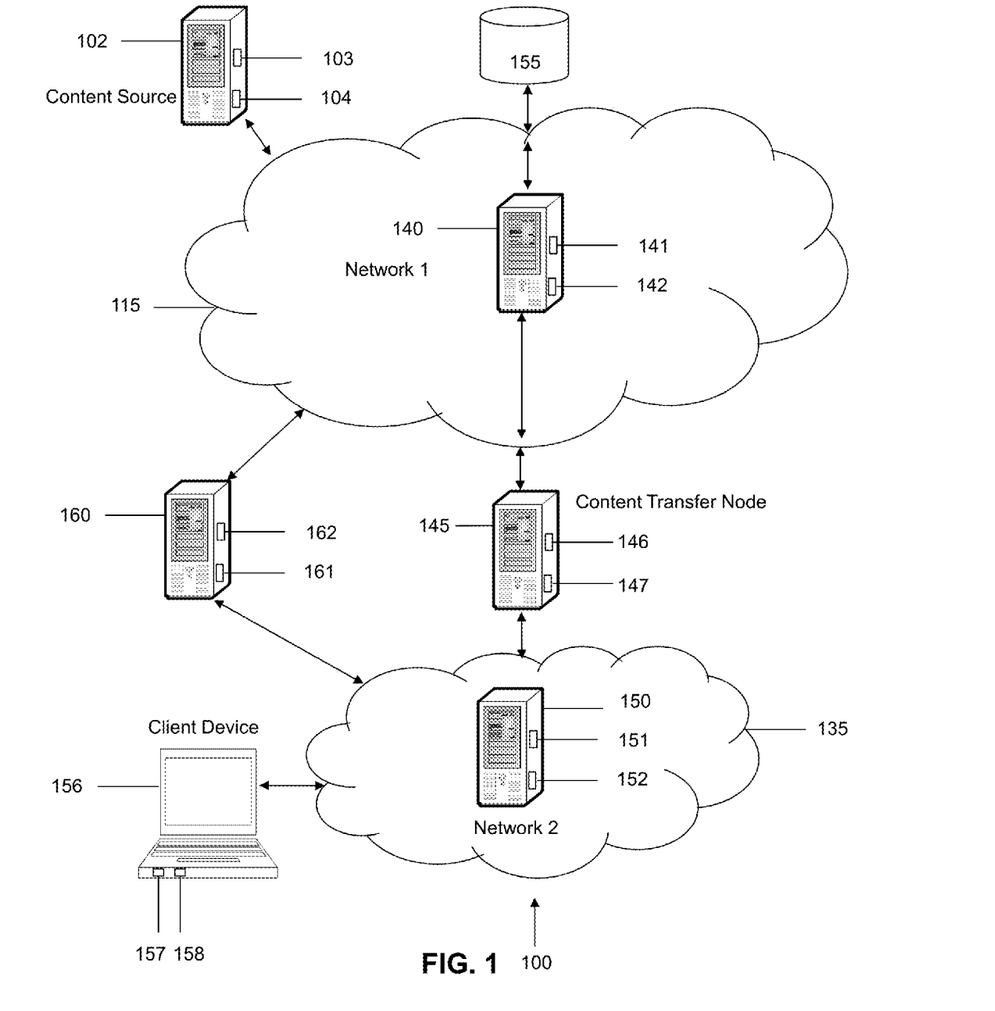
FIG. 1 is a schematic diagram of a system for providing downstream bandwidth aware adaptive bit rate selection according to an embodiment of the present disclosure.
Figure 2:
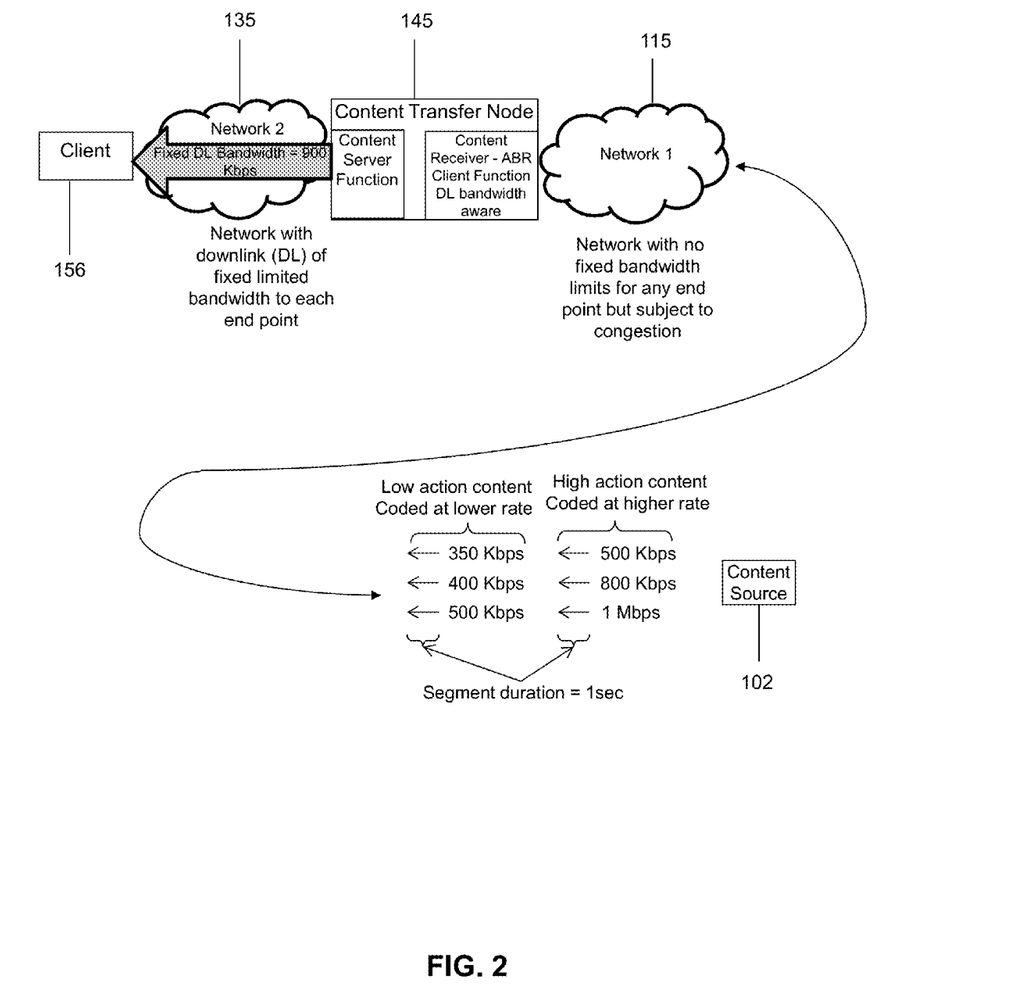
FIG. 2 is a schematic diagram of the system of FIG. 1 illustrating how bandwidth selection for content segments is performed by a content transfer node of the system.

Referring to the drawings and in particular to FIGS. 1-2, the system 100 may provide downstream bandwidth aware adaptive bit rate selection from an upstream network, such as first network 115. The system 100 may be configured to support, but is not limited to supporting, content delivery services, cloud computing services, voice-over-internet protocol services (VoIP), software as a service (SaaS) applications, gaming applications and services, productivity applications and services, mobile applications and services, and any other computing applications and services. The system 100 may include one or more users that may utilize client device 156 to access content, data, and services provided by a content source, such as content source device 102. In certain embodiments, the client device 156 and the content source device 102 may be computers, servers, mobile devices, smartphones, computer tablets, or any other computing devices. In one embodiment, the content source device 102 may include a memory 103 that includes instructions, and a processor 104 that executes the instructions from the memory 103 to perform various operations that are performed by the content source device 102. The processor 104 may be hardware, software, or a combination thereof. Similarly, the client device 156 may include a memory 157 that includes instructions, and a processor 158 that executes the instructions from the memory 157 to perform various operations that are performed by the client device 156. The processor 158 may be hardware, software, or a combination thereof.

One or more users in the system 100 may utilize the client device 156 to request content that is provided by the content source device 102. In certain embodiments, the content may include, but is not limited to, audio content, video content, text content, image content, gaming content, web content, any other type of content, and any combination thereof. The request for the content may be transmitted from the client device 156 to a second network 135, which may be a network provider network of the user using the client device 156. In certain embodiments, the second network 135 may be configured to have a fixed and limited bandwidth to each end point of the second network 135. The fixed bandwidth may be a fixed downlink (DL) bandwidth for sending content from the content transfer node 145 to the second network 135, to the client device 102, or a combination thereof. The second network 135 may be configured to link the client device 156 with the server 150, the server 160, the content transfer node 145, the first network 115, the server 140, the content source device 102, the database 155, or any combination thereof. Additionally, the second network 135 may be configured to transmit, generate, and receive any information and data traversing the system 100. In one embodiment, the second network 135 may include any number of additional servers in addition to the server 150. The second network 135 may also include and be connected to a mobile network, a wireless network, an ethernet network, a satellite network, a broadband network, a cellular network, a private network, a cable network, the Internet, an internet protocol network, a multiprotocol label switching (MPLS) network, a content distribution network, or any combination thereof. In certain embodiments, the second network 135 may be multicast-enabled, broadcast-enabled, or a combination thereof. In one embodiment, the second network 135 may be part of a single autonomous system that is located in a particular geographic region, or be part of multiple autonomous systems that span several geographic regions.

Once the request for content arrives at the second network 135, the request for content from the client device 156 may then be transmitted from the second network 135 to the content transfer node 145, such as via server 150. In certain embodiments, the content transfer node 145 may be a device that resides at a boundary of the second network 135, and may also serve as an intermediary device between the second network 135 and the first network 115. The content transfer node 145 may be a network server, a router, a gateway, a computer, a mobile device, or any other suitable computing device. Additionally, the content transfer node 145 may include a memory 146 that includes instructions, and a processor 147 that executes the instructions from the memory 146 to perform various operations that are performed by the content transfer node 145. The processor 147 may be hardware, software, or a combination thereof.

Notably, the content transfer node 145 may include a content server function and a content receiver function. In certain embodiments, the content server function and the content receiver function may be software functions associated with one or more computer programs residing on or accessible by the content transfer node 145. The content server function of the content transfer node 145 may be utilized by the system 100 to allocate a fixed bandwidth, such as a maximum bandwidth, for any particular transmission that occurs on the second network 135. As a result, the content server function is aware of the fixed downstream bandwidth for transmitting content to clients of the second network 135, such as client device 156. The content server function may provide information indicating the allocated fixed bandwidth to the content receiver function of the content transfer node 145. As a result, the content receiver function may be made aware of the fixed downstream bandwidth for transmitting content to the clients of the second network 135, such as client device 156.

The content receiver function of the content transfer node 145 may be configured to connect to the first network 115, which may be a content provider network associated with the content source device 102. Additionally, the content receiver function may serve as an adaptive bit rate client of the first network 115. The first network 115 may be utilized by the system 100 to distribute content or other data throughout the system 100, and may be configured to have no specific bandwidth constraints for any end point in the first network 115. For example, the devices of the system 100 may connect to the first network 115 with no specific receiver bandwidth constraints, and may not have any content streaming constraints. The first network 115 may be configured to link the content source device 102 with the server 140, the server 160, the content transfer node 145, the second network 135, the server 150, the client device 156, the database 155, or any combination thereof. Additionally, the first network 115 may be configured to transmit, generate, and receive any information and data traversing the system 100. In one embodiment, the first network 115 may include any number of additional servers in addition to the server 140, and may connect to any number of content source devices 102. The first network 115 may also include and be connected to a mobile network, a wireless network, an ethernet network, a satellite network, a broadband network, a cellular network, a private network, a cable network, the Internet, an internet protocol network, a multiprotocol label switching (MPLS) network, a content distribution network, or any combination thereof. In one embodiment, the first network 115 may be part of a single autonomous system that is located in a given geographic region, or be part of multiple autonomous systems that span several geographic regions.

Based on the request for the content that is received at the content transfer node 145 and the awareness of the allocated and fixed downstream bandwidth available for transmitting content to the client device 156 of the second network 135, the content receiver function of the content transfer node 145 may request one or more content segments of the content from the content source device 102, such as via first network 115. Notably, when requesting the content segments, the content receiver function may transmit one or more requests for content segments that are encoded at a bandwidth or bit rate that is equal to the lesser of (1) the allocated fixed bandwidth of the second network 135 and (2) the adaptive bit rate that is selected based on congestion conditions experienced on the first network 115. In certain embodiments, the requested content segments may be encoded at a bit rate that is less than the lesser of (1) the allocated fixed bandwidth of the second network 135 and (2) the adaptive bit rate that is selected based on congestion conditions experienced on the first network 115. In one embodiment, the congestion conditions may be measured based on the congestion conditions that the content receiver function of the content transfer node 145 experiences when accessing the first network 115. In another embodiment, the selection of the adaptive bit rate based on the congestion conditions experienced by the content receiver function may be performed by the content transfer node 145 itself.

Once the one or more requests for the content segments are received by the first network 115, the first network 115 may transmit the one or more requests to the content source device 102. The content source device 102 may receive the one or more requests for the content segments, and encode content segments at a bandwidth or bit rate matching the bandwidth or bit rate specified in the requests sent by the content transfer node 145. The encoded content segments may be transmitted from the content source device 102 to the first network 115, which may then forward the encoded content segments to the content transfer node 145. The content receiver function, the content server function, any other desired function, or any combination thereof of the content transfer node 145 may perform further processing on the encoded content segments to ensure greater resiliency when the content segments are sent over the second network 135, such as during a broadcast over the air. As an example, if the second network 135 has a fixed bandwidth of 900 Kbps and the only available encoding from the first network 115 is 1 Mbps, the content transfer node 145 may transcode or otherwise transform the 1 Mbps content into a 900 Kbps version of the content. In this way, the content transfer node 145 may forward content conforming to the fixed bandwidth of the second network 135 even if the first network 115 does not have an encoding of the content that matches the fixed bandwidth of the second network 135 readily available. Additionally, the content receiver function may modify metadata corresponding to the bit rate for the encoded content segments. The metadata may include, but is not limited to, information describing the type of content, information indicating the bit rate for the content segments, information indicating the fixed bandwidth of the second network 135, information indicating an internet protocol address of the client device 156, information indicating an internet protocol address of the content source device 102, any other information associated with the content, or any combination thereof.

At this point, the modified metadata and the encoded content segments may be forwarded by the content receiver function to the content server function of the content transfer node 145. The content server function may then forward the metadata and the encoded content segments over the allocated and fixed bandwidth to the client device 156, such as via second network 135. The client device 156 may then receive the metadata and the encoded content segments, and a user of the client device 156 may experience the content. The user of the client device 156 may experience the content in real-time as the content is streamed to the client device 156 by the content server function.

Notably, as congestion conditions change in the first network 115, the content receiver function of the content transfer node 145 may adjust requests for subsequent content segments of the content or requests for new content based on a change in the congestion conditions. For example, if a congestion conditions increase on the first network 115, the fixed bandwidth of the second network 135 remains the same, and the congestion conditions indicate that only content segments encoded at a bit rate less than the fixed bandwidth may be provided by the first network 115, the content receiver function may request the subsequent content segments or the new content segments at the bit rate that is less than the fixed bandwidth that may be provided by the first network 115. However, if congestion conditions decrease on the first network 115 such that the content segments may be encoded at a bit rate higher than the fixed bandwidth of the second network 135, the content receiver function may request content segments that are encoded at the fixed bandwidth of the second network 135. As a result, the requests for content segments may be adjusted in real time as congestion conditions experienced on the first network 115 change over time, and the client device 156 may not receive content segments that are encoded at a bit rate greater than the fixed bandwidth of the second network 135. Thus, when a user receives a stream of content segments based on the real-time adjustment of the content segments, the user will have a high-quality experience when experiencing the content.

When the first network 115 receives requests for different encodings of content and content source device 102 provides the different encodings of the content the first network 115, the first network may cache the encodings at the database 155 or on a device of the first network 115 itself. Based on such caching, if subsequent requests for content are made by the content transfer node 145 for encodings that have already been cached by the first network 115 of the database 155, the first network 115 or the database 155 may directly transmit the requested encoded segments directly to the content transfer node 145 without having to request the content source device 102 to provide the content.

Notably, any of the functionality and features of the system 100 may be supported and executed by using any combination of the servers 140 and 150, and the content transfer node 145. In one embodiment, the server 140 may include a memory 141 that includes instructions, and a processor 142 that executes the instructions from the memory 141 to perform various operations that are performed by the server 140. Furthermore, the server 150 may include a memory 151 that includes instructions, and a processor 152 that executes the instructions from the memory 151 to perform various operations that are performed by the server 150. The processors 142 and 152 may be hardware, software, or a combination thereof. In certain embodiments, the servers 140 and 150 may be network servers, routers, gateways, computers, mobile devices, or any other suitable computing device.

Additionally, the database 155 of the system 100 may be utilized to store and relay information that traverses the system 100, cache content that traverses the system 100, store data about each of the devices in the system 100, and perform any other typical functions of a database. In one embodiment, the database 155 may be connected to or reside within the first network 115. However, in certain embodiments, the database 155 may be connected to or reside within the second network 135. Additionally, the database 155 may include a processor and memory or be connected to a processor and memory to perform the various operation associated with the database 155. In one embodiment, the database 155 may be connected to the servers 140, 150 and 160, the content transfer node 145, the content source device 102, the client device 156, the first network 115, and the second network 135. The database 155 may also store information relating to the requests for content and metadata traversing the system 100, data relating to the encoding of the content, different encoded versions of the content, bandwidth information for the first network 115 and the second network 135, client device 156 information, content source device 102 information, and data responsive to the requests traversing the system 100. Furthermore, the database 155 may be configured to process queries sent to it by any device in the system 100.

Operatively, the system 100 may provide downstream bandwidth aware adaptive bit rate selection from an upstream network, such as first network 115, as shown in the following example scenario. In the example scenario and referring also to FIG. 2, the user using client device 156 may want to watch sports game content, such as a football game. The football game may include both low action content and high action content. In certain embodiments, low action content may be content that requires less bandwidth resources than the high action content, which may require significant bandwidth resources. For example, low action content may occur when the players of the football game are not moving or there are not many other movements going on during the game. On the other hand, high action content may occur when a player is running across the football field and the background scenery is changing rapidly, or when there are multiple other movements going on during the game. As shown in FIG. 2, high action content may be encoded at bit rates that are generally higher than low action content.

In order to watch the game, the user may transmit a request for the sports game content to the second network 135, which may then forward the request to the content transfer node 145. The content server function of the content transfer node 145 may set a fixed and allocated bandwidth for any transmission occurring on the second network 135. For example, the fixed and allocated bandwidth may be set at 900 Kpbs, such as shown in FIG. 2. Additionally, the content server function may transmit information identifying the fixed and allocated bandwidth for the second network 135 to the content receiver function of the content transfer node 145, along with the request for the content. The content receiver function may then transmit a request for a content segment of the content that is encoded at a bit rate that is equal to or less than the lesser of (1) the allocated fixed bandwidth of the second network 135 (in this case 900 Kbps) and (2) the adaptive bit rate that may be selected based on congestion conditions experienced on the first network 115.

If congestion conditions indicate that there is light congestion experienced on the first network 115, then the perhaps 1 Mbps may be the adaptive bit rate that could be selected by the content receiver function. However, since the fixed bandwidth is 900 Kpbs and the congestion conditions indicate that the adaptive bit rate selected could be 1 Mbps, then the content receiver function may send a request to the first network 115 for the content segment of the content that is encoded at a bit rate of 900 Kpbs or less. This would prevent the user the client device 156 from receiving content that is encoded at a bit rate that is higher than the second network 135 can handle. However, if congestion conditions indicate that there is heavy congestion experienced on the first network 115, then perhaps 500 Kbps would be the highest adaptive bit rate that could be selected by the content receiver function. In this case, since the fixed bandwidth is 900 Kpbs and the congestion conditions indicate that the adaptive bit rate selected would be 500 Kbps, then the content receiver function may send a request to the first network 115 for the content segment of the content that is encoded at a bit rate of 500 Kpbs or less.

Once the request for the content segment at the desired encoding is sent to the first network 115, the first network 115 can provide the requested content at the desired encoding if the content is already cached on the first network 115. However, if the content at the desired encoding is not already available on the first network 115, the first network 115 may send a request for the desired encoding to the content source device 102. The content source device 102 may encode a content segment at the desired bit rate and transmit the encoded content to the first network 115, which may then transmit the encoded content segment to the content transfer node 145. The content receiver function of the content transfer node 145 may modify metadata appropriate for the desired bit rate for the content segment and forward the metadata to the content server function. The content server function may then forward the metadata and the requested encoded content to the client device 156 subject to the fixed bandwidth of the second network 135.

As congestion conditions experienced on the first network 115, the requests for content segments associated with the content may be adjusted to obtain content segments that are encoded at bit rates appropriate for the changes in congestion conditions. Eventually, the content source device 102 may create multiple encodings of the same segment of content for the same duration of time. For example, as shown in FIG. 2, high action content may have content segments encoded at 500 Kpbs, 800 Kpbs, and 1 Mpbs available, and low action content may have content segments encoded at 350 Kpbs, 400 Kpbs and 500 Kpbs available. In this example, the content segment duration for these segments may be one second, however, other content segments durations may be utilized. Continuing with the football game example, if a low action sequence is occurring during the football game, the content receiver function may select the best possible encoding based on the 900 Kpbs fixed bandwidth for the second network 135. In this case, the content receiver function may select the 500 Kpbs low action content encoding to be transmitted to the client device 156 because that is the best encoding for the low action content available.

However, if a high action sequence is occurring during the football game, the content receiver function will determine that it should request the content segment encoded at the 800 Kpbs bit rate and not the 1 Mpbs bit rate because the content segment encoded at the 1 Mpbs bit rate cannot be handled by the second network 135 and would cause a poor viewing experience for the user. Notably, the requests for the content segments may be adjusted in real-time as the content is being streamed to the client device 156, as the congestion conditions change with respect to the first network 115, when the fixed bandwidth of the second network 135 is changed, as device capabilities of the client device 156 change (e.g. screen size, resolution, internet connection, etc.), or any combination thereof. Furthermore, the system 100 may include the capabilities typically provided by a provisioning system or be connected to a provisioning system that may be utilized to change the fixed bandwidth or other characteristics of the second network 135 based on congestion conditions, network operator inputs, or any other desired reason. The provisioning system or the system 100 itself may forward the information relating to the change in fixed bandwidth or other characteristics to the content transfer node 145 so that the content transfer node 145 is aware of the changes. Based on the updated information relating to the second network 135, the content transfer node 145 may adjust the requests for content segments that the content transfer node 145 sends to the first network 115 so that content segments conforming to the change in the fixed bandwidth may be obtained and sent to the client device 102. If content segments conforming to the change in the fixed bandwidth are not available on the first network 115, the content transfer node 145 may select the best available encoding from the first network 115 and transcode or otherwise transform the encoding from the first network 115 into an encoding that matches the new fixed bandwidth of the second network 135. Then, the appropriate encoded version of the content may be sent to the client device 102.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, determining the fixed bandwidth available to transmit content to the client device 156 on the second network 135, connecting to the first network 115 to obtain the content, requesting and receiving a content segment of the content that is encoded at a bandwidth that is less than or equal to the lesser of the fixed bandwidth on the second network 135 and an adaptive bit rate selected based on congestion conditions associated with the first network 115, transmitting the content segment at the encoded bandwidth to the client device 156 on the second network 135, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including an a content source device 102, a server 140, a content transfer node 145, a server 150, a server 160, a database 155, and a client device 156. However, the system 100 may include multiple content source devices 102, multiple content transfer nodes 145, multiple servers 140, 150, and 160, multiple databases 155, multiple client devices 146, or any number of any of the other components in the system 100. Furthermore, in one embodiment, substantial portions of the functionality and operations of the system 100 may be performed by other networks and systems that are connected to system 100.

Figure 3:
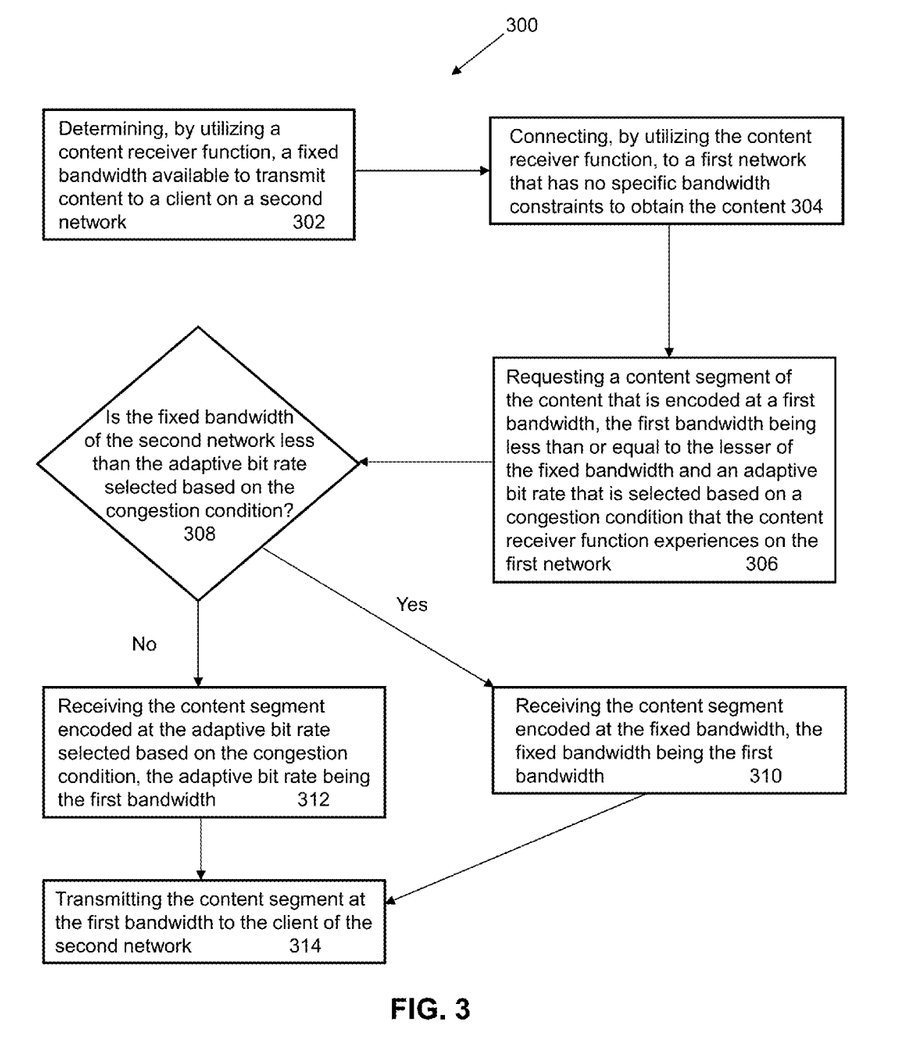
FIG. 3 is a flow diagram illustrating a sample method for providing downstream bandwidth aware adaptive bit rate selection according to an embodiment of the present disclosure.

As shown in FIG. 3, an exemplary method 300 for downstream bandwidth aware adaptive bit rate selection from an upstream network, such as first network 115 is schematically illustrated, and may include, at step 302, determining, by utilizing a content receiver function, a fixed bandwidth available to transmit content to a client device 156 on a second network 135. In one embodiment, the determination may be performed by the content transfer node 145, the server 160, any combination thereof, or other appropriate device. At step 304, the method 300 may include connecting, by utilizing the content receiver function, to the first network 115, which may be configured to have no specific bandwidth constraints, but may be subject to congestion conditions. In one embodiment, the connection may be performed by the content transfer node 145, the server 160, any combination thereof, or other appropriate device. Then, at step 306, the method 300 may include requesting a content segment of the content that is encoded at a first bandwidth. The first bandwidth may be less than or equal to the lesser of the fixed bandwidth of the second network 135 and an adaptive bit rate that is selected based on a congestion condition that is experienced on the first network 115. In one embodiment, the congestion condition may be experienced by the content receiver function on the first network 115. In one embodiment, the request for the content segment may be performed by the content transfer node 145, the server 160, any combination thereof, or other appropriate device.

At step 308, the method 300 may include determining if the fixed bandwidth of the second network 135 is less than the adaptive bit rate selected based on the congestion condition. In one embodiment, the determining may be performed by the content transfer node 145, the server 160, any combination thereof, or other appropriate device. If the fixed bandwidth of the second network 135 is less than the adaptive bit rate selected based on the congestion condition, the method 300 may include, at step 310, receiving the content segment encoded at the fixed bandwidth, the fixed bandwidth in this case being the first bandwidth. In one embodiment, the receiving may be performed by the content transfer node 145, the server 160, any combination thereof, or other appropriate device. If, however, the fixed bandwidth of the second network 135 is more than the adaptive bit rate selected based on the congestion condition, then the method 300 may include, at step 312, receiving the content segment encoded at the adaptive bit rate. In this scenario, the first bandwidth may be the adaptive bit rate. In one embodiment, the receiving may be performed by the content transfer node 145, the server 160, any combination thereof, or other appropriate device. At step 314, the method 300 may include transmitting the content segment at the first bandwidth to the client device 156 of the second network 135.

It is important to note that the methods described above may incorporate any of the functionality, devices, and/or features of the system 100 and subsystems described above, or otherwise, and are not intended to be limited to the description or examples provided herein. In one embodiment, the system 100 and methods described herein may further include utilizing any of the various components described in the system 100 to perform the operative functions disclosed herein.

Figure 4:
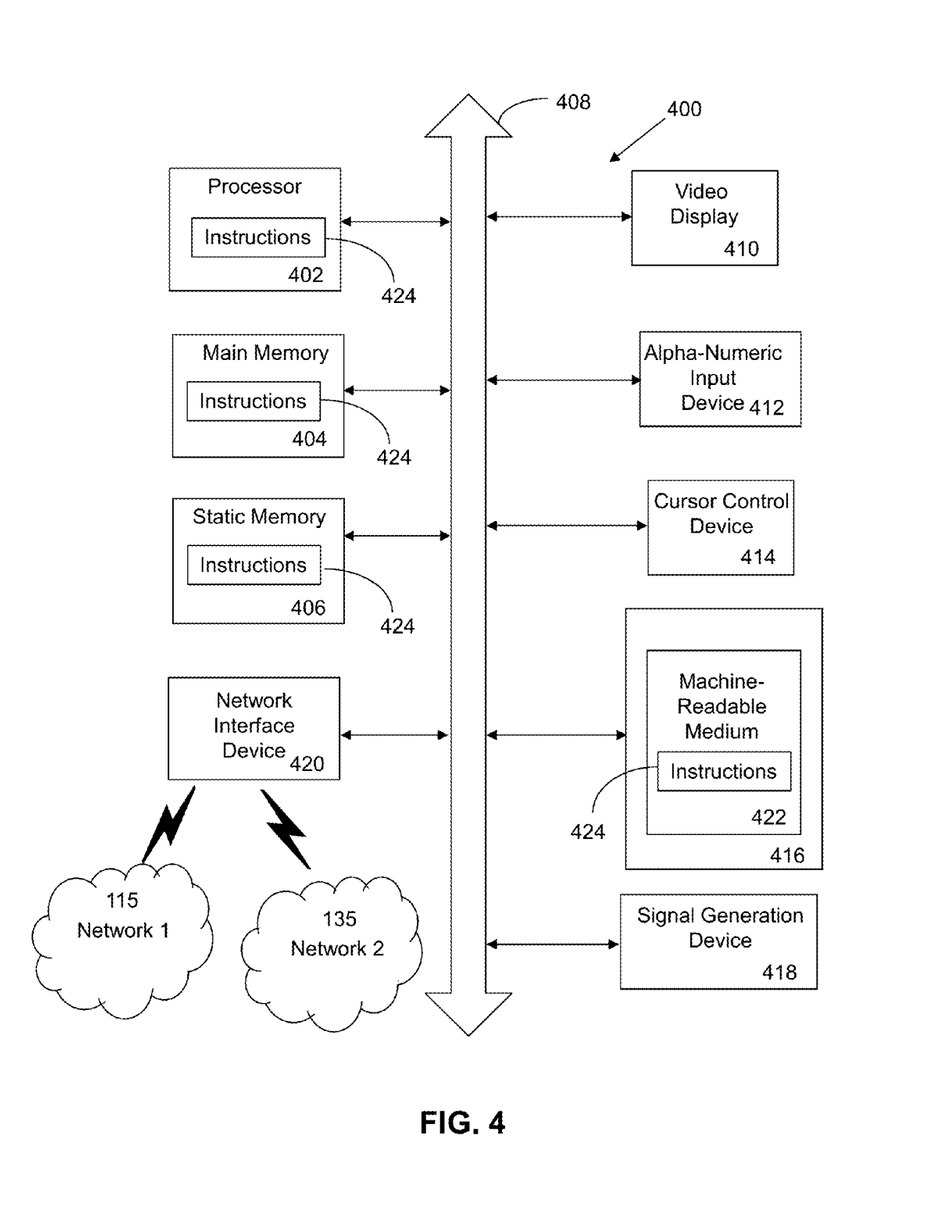
FIG. 4 is a schematic diagram of a machine in the form of a computer system within which a set of instructions, when executed, may cause the machine to perform any one or more of the methodologies or operations of the systems and methods for providing downstream bandwidth aware adaptive bit rate selection.

Referring now also to FIG. 4, at least a portion of the methodologies and techniques described with respect to the exemplary embodiments of the system 100 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using first network 115, second network 135, another network, or a combination thereof) to and assist with operations performed by other machines, such as, but not limited to, the content source device 102, the server 140, the content transfer node 145, the server 150, the database 155, the client device 156, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410, which may be, but is not limited to, a liquid crystal display (LCD), a flat panel, a solid state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of instructions 424, such as, but not limited to, software embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 422 containing instructions 424 so that a device connected to the first network 115, the second network 135, other network, or a combination thereof, can send or receive voice, video or data, and to communicate over the first network 115, second network 135, other network, or a combination thereof, using the instructions. The instructions 424 may further be transmitted or received over the first network 115, second network 135, other network, or a combination thereof, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The terms "machine-readable medium" or "machine-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium" or "machine-readable device" may be non-transitory. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system for providing downstream bandwidth aware adaptive bit rate selection, the system comprising:
    a memory that stores instructions;
    a processor that executes the instructions to perform operations, the operations comprising:
        determining, by utilizing a content receiver function of a content transfer node, a fixed bandwidth available to transmit content to a client on a second network, wherein the fixed bandwidth is allocated by a content server function;
        connecting, by utilizing the content receiver function, to a first network to obtain the content, wherein the first network has no specific bandwidth constraints, wherein the content transfer node serves as an intermediary between the first network and the second network;
        receiving, from the first network, a content segment of the content that is encoded at a first bandwidth, wherein the first bandwidth is less than or equal to the lesser of the fixed bandwidth available to transmit the content to the client on the second network and a first adaptive bit rate that is selected based on a congestion condition that the content receiver function of the content transfer node experiences on the first network while serving as an adaptive bit rate client of the first network;
        modifying first metadata corresponding to a bit rate for the content segment that is encoded at the first bandwidth, wherein the first metadata that is modified comprises information describing a content type of the content segment, information indicating the fixed bandwidth of the second network, and information indicating an internet protocol address of a content source of the content segment;
        transmitting, with the first metadata, the content segment at the first bandwidth to the client on the second network; and
        adjusting requests for subsequent content segments of the content as a device capability of the client changes, wherein the device capability comprises a resolution capability of the client.

2. The system of claim 1, wherein the operations further comprise receiving a next content segment of the content that is encoded at a second bandwidth, wherein the second bandwidth is the lesser of the fixed bandwidth available to transmit the content to the client on the second network and a second adaptive bit rate that is selected based on a change in the congestion condition that the content receiver function experiences on the first network.

3. The system of claim 2, wherein the operations further comprise modifying, by utilizing the content receiver function, second metadata associated with the next content segment, wherein the second metadata corresponds to the second bandwidth.

4. The system of claim 3, wherein the operations further comprise transmitting, by utilizing the content server function, the next content segment and the second metadata associated with the next content segment to the client at the second bandwidth.

5. The system of claim 1, wherein the operations further comprise receiving a request for the content from the client on the second network.

6. The system of claim 1, wherein low action content of the content is encoded at a lower rate than high action content of the content.

7. The system of claim 1, wherein the operations further comprise transcoding the content segment at the content transfer node after receiving the content segment.

8. The system of claim 1, wherein the operations further comprise adjusting the requests for the subsequent content segments of the content based on a change in the congestion condition.

9. The system of claim 1, wherein the first network is associated with a content provider and the second network is associated with a network provider of the client.

10. A method for providing downstream bandwidth aware adaptive bit rate selection, the method comprising:
    determining, by utilizing a content receiver function of a content transfer node, a fixed bandwidth available to transmit content to a client on a second network, wherein the fixed bandwidth is allocated by a content server function;
    connecting, by utilizing the content receiver function, to a first network to obtain the content, wherein the first network has no specific bandwidth constraints, wherein the content transfer node serves as an intermediary between the first network and the second network;
    receiving, from the first network, a content segment of the content that is encoded at a first bandwidth, wherein the first bandwidth is less than or equal to the lesser of the fixed bandwidth available to transmit the content to the client on the second network and a first adaptive bit rate that is selected based on a congestion condition that the content receiver function of the content transfer node experiences on the first network while serving as an adaptive bit rate client of the first network, wherein the content segment is received by utilizing instructions from memory that are executed by a processor;
    modifying first metadata corresponding to a bit rate for the content segment that is encoded at the first bandwidth, wherein the first metadata that is modified comprises information describing a content type of the content segment, information indicating the fixed bandwidth of the second network, and information indicating an internet protocol address of a content source of the content segment;
    transmitting, with the first metadata, the content segment at the first bandwidth to the client on the second network; and
    adjusting requests for subsequent content segments of the content as a device capability of the client changes, wherein the device capability comprises a resolution capability of the client.

11. The method of claim 10, further comprising receiving a next content segment of the content that is encoded at a second bandwidth, wherein the second bandwidth is the lesser of the fixed bandwidth available to transmit the content to the client on the second network and a second adaptive bit rate that is selected based on a change in the congestion condition that the content receiver function experiences on the first network.

12. The method of claim 11, further comprising modifying, by utilizing the content receiver function, second metadata associated with the next content segment, wherein the second metadata corresponds to the second bandwidth.

13. The method of claim 12, further comprising transmitting, by utilizing the content server function, the next content segment and the second metadata associated with the next content segment to the client at the second bandwidth.

14. The method of claim 10, further comprising receiving a request for the content from the client on the second network.

15. The method of claim 10, wherein low action content of the content is encoded at a lower rate than high action content of the content.

16. The method of claim 10, further comprising transcoding the content segment at the content transfer node after receiving the content segment.

17. The method of claim 10, further comprising adjusting the requests for the subsequent content segments of the content based on a change in the congestion condition.

18. The method of claim 10, further comprising requesting a next content segment of the content that is encoded at a second bandwidth.

19. A computer-readable device comprising instructions, which when loaded and executed by a processor, cause the processor to perform operations, the operations comprising:
  determining, by utilizing a content receiver function of a content transfer node, a fixed bandwidth available to transmit content to a client on a second network, wherein the fixed bandwidth is allocated by a content server function;
  connecting, by utilizing the content receiver function, to a first network to obtain the content, wherein the first network has no specific bandwidth constraints, wherein the content transfer node serves as an intermediary between the first network and the second network;
  receiving, from the first network, a content segment of the content that is encoded at a first bandwidth, wherein the first bandwidth is less than or equal to the lesser of the fixed bandwidth available to transmit the content to the client on the second network and a first adaptive bit rate that is selected based on a congestion condition that the content receiver function of the content transfer node experiences on the first network while serving as an adaptive bit rate client of the first network;
  modifying first metadata corresponding to a bit rate for the content segment that is encoded at the first bandwidth, wherein the first metadata that is modified comprises information describing a content type of the content segment, information indicating the fixed bandwidth of the second network, and information indicating an internet protocol address of a content source of the content segment;
  transmitting, with the first metadata, the content segment at the first bandwidth to the client on the second network; and
  adjusting requests for subsequent content segments of the content as a device capability of the client changes, wherein the device capability comprises a resolution capability of the client.

20. The computer-readable device of claim 19, wherein the operations further comprise receiving a next content segment of the content that is encoded at a second bandwidth, wherein the second bandwidth is the lesser of the fixed bandwidth available to transmit the content to the client on the second network and a second adaptive bit rate that is selected based on a change in the congestion condition that the content receiver function experiences on the first network.

* * * * *